June 19, 1951

E. L. TRIMAN 2,557,581

REMOTE CONTROL SYSTEM

Filed Feb. 15, 1947

Inventor.
Eugene L. Triman.
By. Sheridan Davis & Caspell
Attorneys.

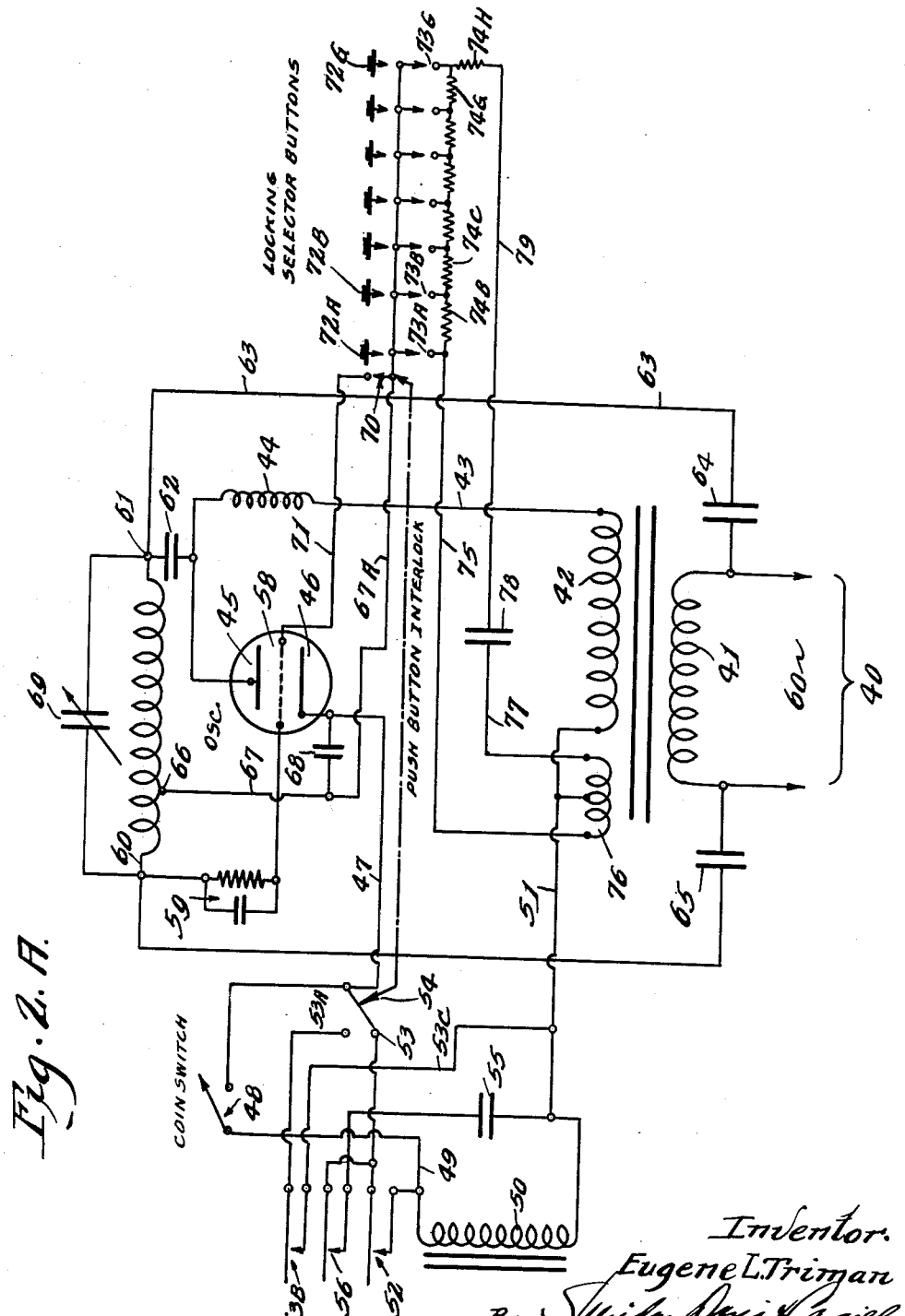

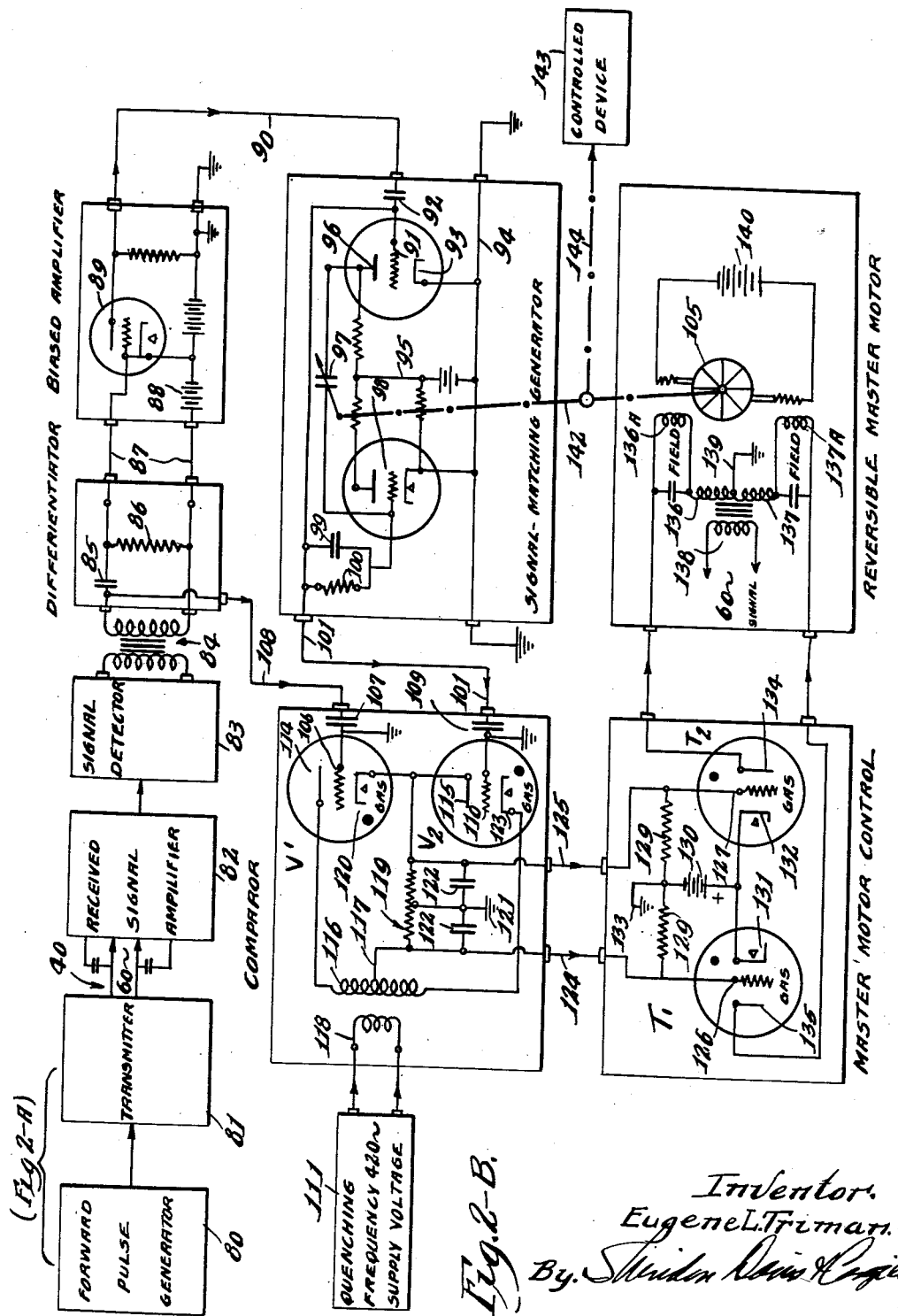

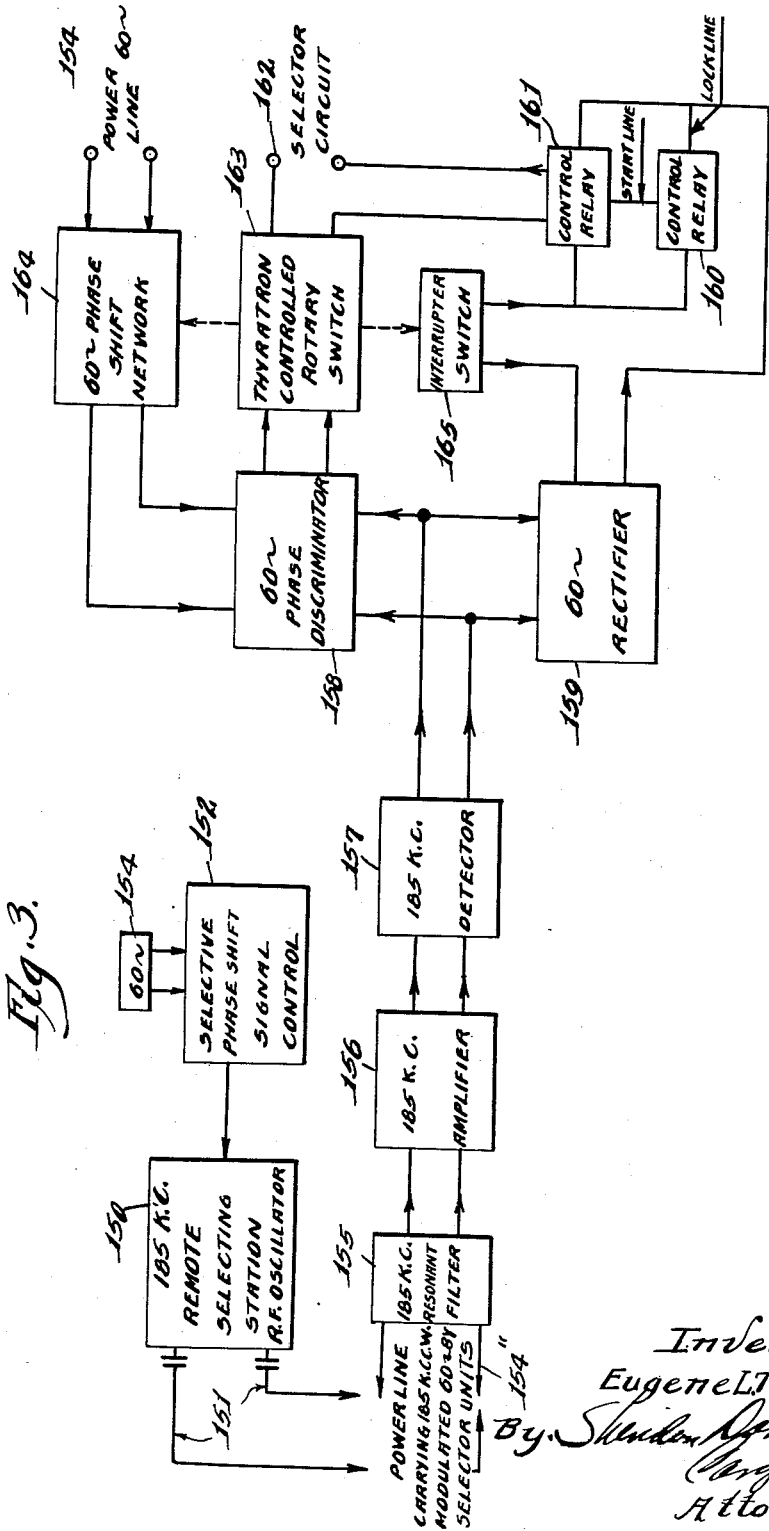

June 19, 1951

E. L. TRIMAN 2,557,581

REMOTE CONTROL SYSTEM

Filed Feb. 15, 1947

Inventor.
Eugene L. Triman
By *[signature]*
Attorneys.

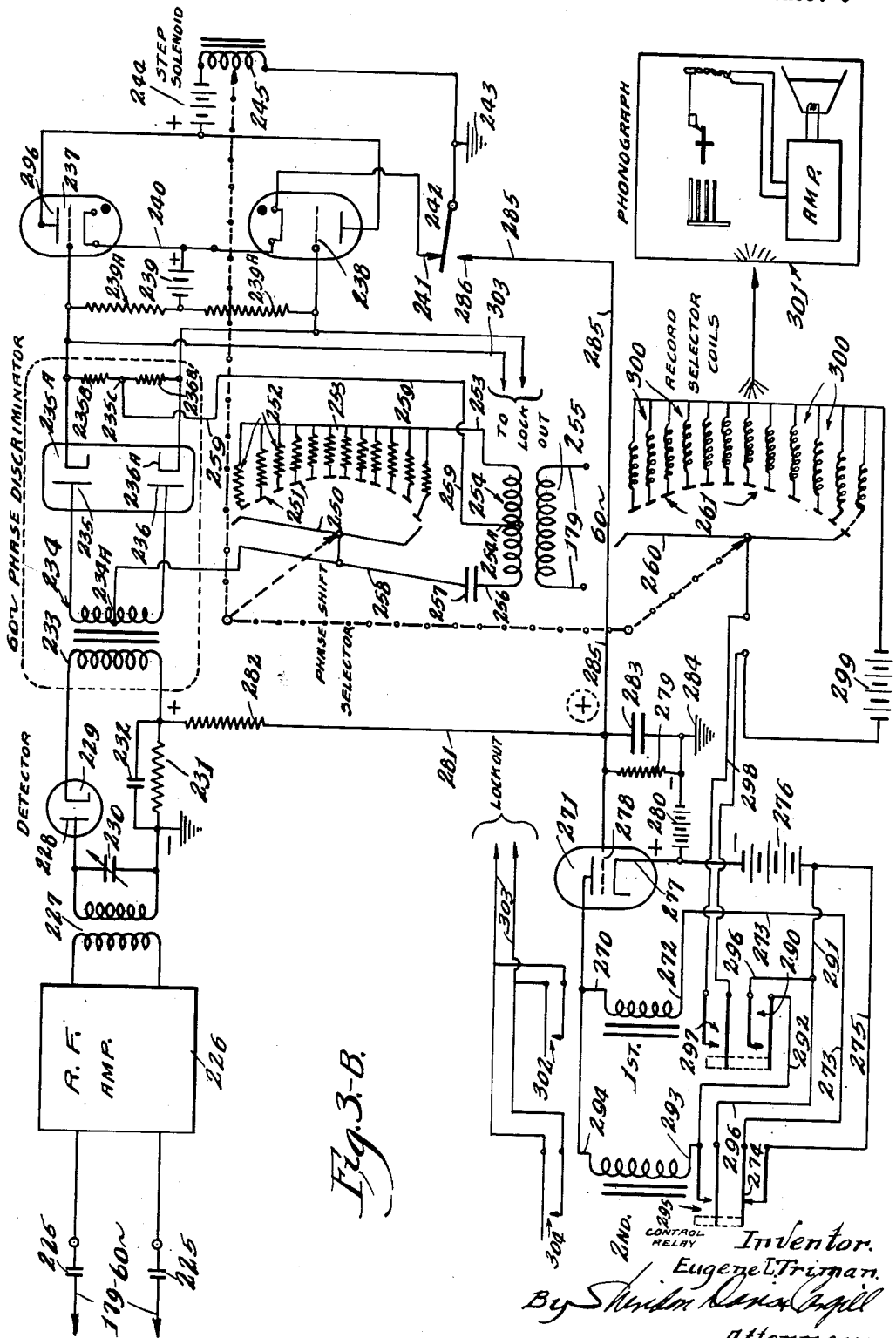
Fig.3-B.

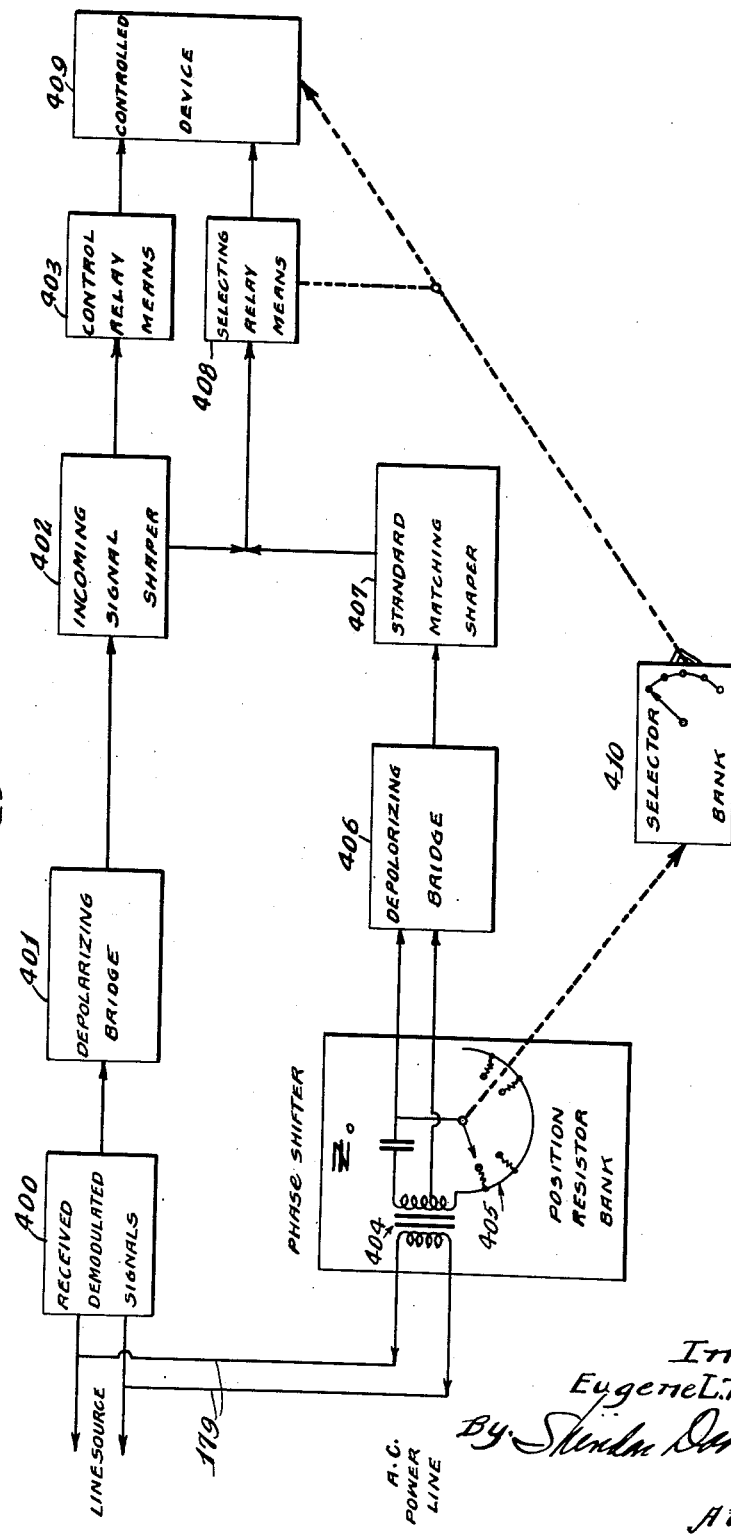

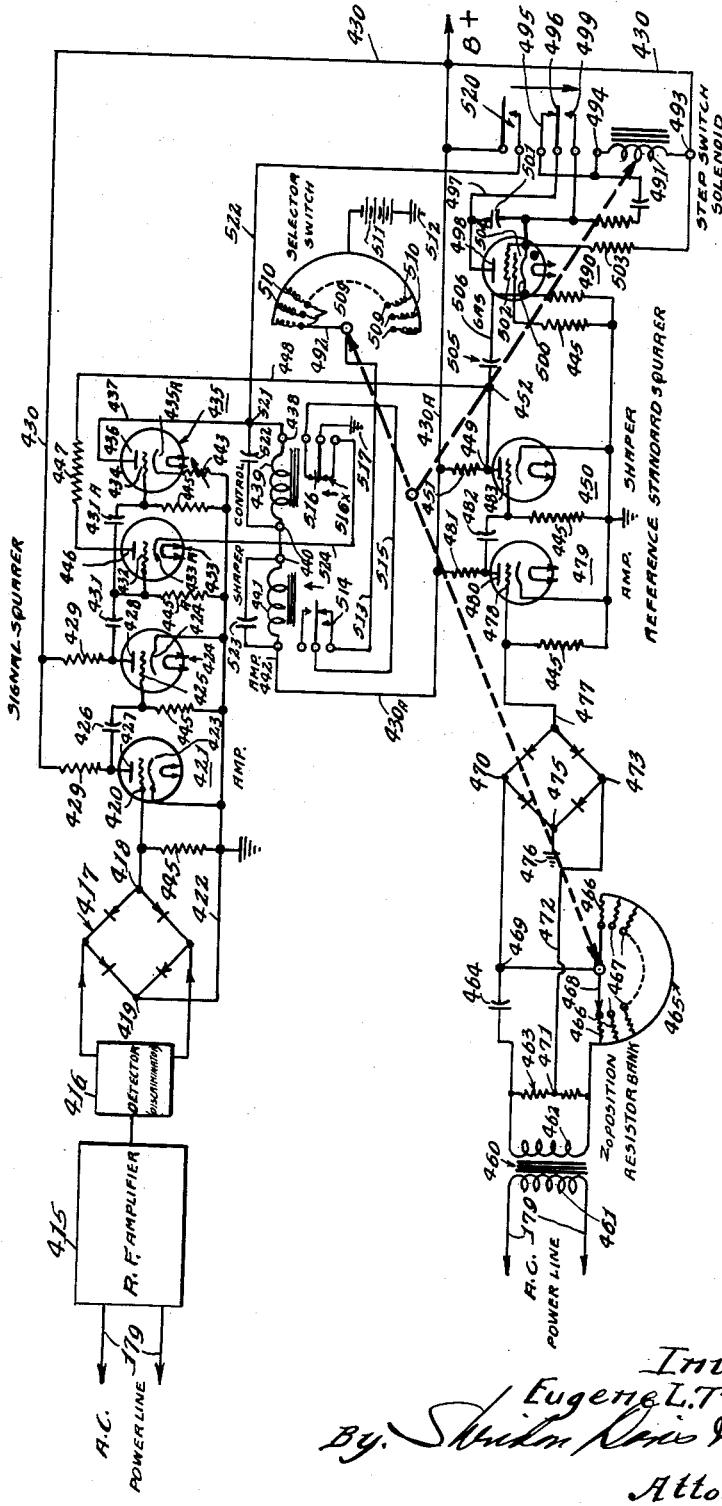

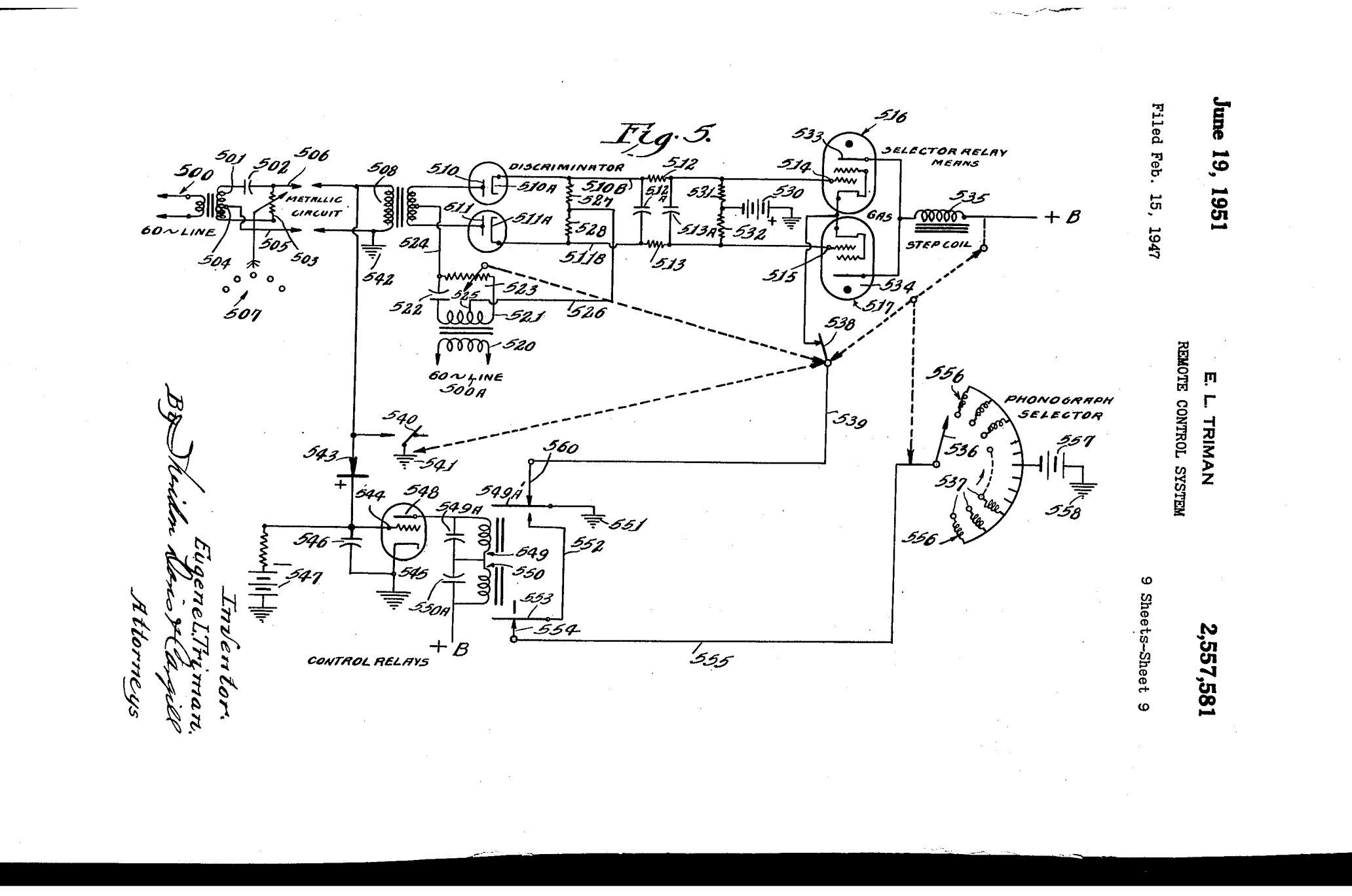

Patented June 19, 1951

2,557,581

UNITED STATES PATENT OFFICE 2,557,581

REMOTE CONTROL SYSTEM

Eugene L. Triman, Chicago, Ill., assignor, by mesne assignments, to Rock-Ola Manufacturing Corporation, Chicago, Ill., a corporation of Delaware Application February 15, 1947, Serial No. 728,765

17 Claims. (Cl. 177—353)

This invention pertains to signalling and signal controlled apparatus of general application, but particularly useful in conjunction with remote control systems and the like.

In its broader aspects, the invention has as one of its principal objects the provision of means for transmitting a signal having a certain predetermined characteristic and utilizing the transmitted signal to control a signal-matching means, at a receiving station, which will effect a matching or duplication of the characteristic of the transmitted signal to provide a resultant control voltage or factor useful in the control of some desired instrumentality or apparatus.

More particularly, it is an object of the invention to provide a remote control system utilizing a transmitted signal, for example a radio frequency carrier modulated desirably as to frequency, phasing, pulse duration or sequence, modulation percentage, or the like, together with a signal-matching means operating under control of the transmitted signal to provide a matching signal reproducing exactly the modulation characteristic of the transmitted signal, the identity or lack of identity of the matched and matching signals being utilized for control purposes at a receiving station remote from the source of transmitted signals.

Another object of the invention is the provision of a remote control system of general application, and especially useful in one of its adaptations for the control of automatic phonographs and the like by signals transmitted over a metallic circuit, including commercial power lines, or by space wave propagation, the transmitted signal having a control characteristic and actuating a local signal generator at the receiving station which is varied under control of the transmitted signal until the locally generated signal is identical in control characteristic to the transmitted signal, the identity or lack of identity between the transmitted and locally generated signals being factors in the actuation of the controlled device, in this instance, the automatic phonograph, to effect for example the selection of a certain phonographic record and the playing thereof.

A further objective aspect of the invention is the provision of remote control apparatus for automatic phonographs and the like, which utilizes selecting signals transmitted without a carrier over a metallic circuit, and in which selection is effected as a result of matching or duplication by a local signal generator of the transmitted signal to afford a resultant control voltage or factor.

Another particularized object is the provision of selecting means actuated responsive to the matching of a local signal with a transmitted selecting signal, both said signals being a phasal function of a standard, alternating or pulsating voltage such as commonly supplied over commercial power lines.

In accordance with one embodiment of the invention, a particular object is the provision of selector-transmitter means including an oscillator emitting radio frequency energy at measured or controlled intervals (for example at standard power line frequencies), and selectively controlled means, for example push-button resistors, for determining the duration of the signal emission within the limits of said intervals, as a function, for example, of phase shift in a voltage, derived from said power lines, applied to the control grid circuit of said oscillator.

Ancillary to the last-mentioned object is the provision of receiving selector means including a signal-matching pulse generator variable, for example by motor means, to modify the duration of pulses generated thereby, and a comparing circuit in which the incoming pulse of predetermined and selected length is compared with pulses from said generator, and which controls the running of said motor until such time as the generated signal is modified to match the received signal, at which time said motor stops, the motor being utilized also to control a desired instrumentality.

In accordance with another object of the invention, there is provided selector-transmitting means emitting signals, for example at radio frequency, which are modulated at a lower modulating frequency by phase-shifted control voltages the phase angle of which is selectively controlled, for example by push-button resistor means, the modulating frequency being desirably that of the power lines supplying the system and/or carrying said signals, and thereby affording a standard reference frequency for modulation and phase shifting at both transmitting and receiving ends.

Incident to the last-mentioned object is the provision of selective receiving means cooperable with the selector-transmitting means thereof, which is characterized by the provision, among other features, of phase-discriminating means upon which is impressed the incoming phase-modulated signal, as well as a locally generated signal or matching voltage the phase angle of which is progressively varied or modified, so long as signals are received, until the incoming and local signals are effectively matched and a predetermined or zero resultant control voltage is produced in the discriminating means for desired control purposes.

A further object in conjunction with the selective receiving means last-mentioned, is the provision of phonograph record selecting control means coacting with a step-by-step phase-shift selector switch which modifies the phase angle of the locally produced signal as aforesaid.

In accordance with still another embodiment of the invention, there is provided a selector-transmitting means emitting a relatively continuous carrier or radio frequency signal which is signal-modulated at selectively variable phase angle values, determined for example by push-button control or the like, or which, if desired, may be frequency-modulated selectively as a function of the aforesaid signal-modulation angle in cases where disturbing amplitude modulations are encountered on power lines transmitting the signals, for example.

Ancillary to the last-mentioned object, is the provision of selective receiving means in which the incoming signal is modified to a relatively non-polar form and subjected to a shaping process to produce, for example, signals the wave form of which is of a certain desired shape, and in which, further, there is produced locally a relatively non-polar reference or matching signal of identical wave shape, which is subjected to a phase-shifting alteration or modification, under control of incoming signals, until there is substantial identity in phase relation between the incoming and local signals to produce a local control or selecting voltage.

Yet another object of the invention in its broader aspects, is the utilization of commercial power lines supplying, for example, a 60 cycle voltage, as a transmission medium and/or a source of modulating voltage and/or a frequency standard with reference to which controlling phase relations in both transmitting and receiving apparatus may be compared or derived.

In addition to the foregoing are other objects and aspects of novelty and utility of detailed and complex character and pertaining to functional and circuit arrangements which are described and explained in view of the annexed drawings, in which:

Fig. 3 is a block diagram of a second embodiment of the system utilizing phase-shift modulation as the signal characteristic;

Fig. 4 is a block diagram of a signal-shaping receiver and generator of particular utility in conjunction with the system of Fig. 3;

Figure 2:
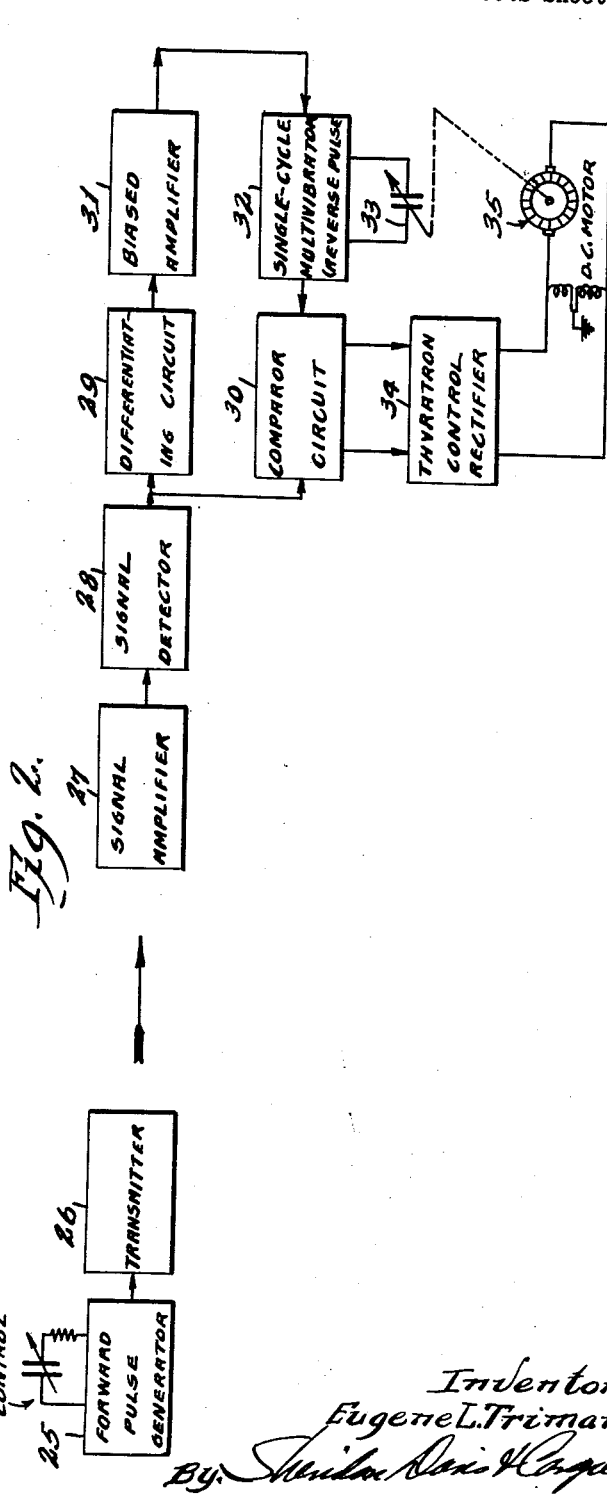
Fig. 2 is a block diagram of a first embodiment of the system utilizing variable pulse duration as the signal characteristic.

Fig. 2—A is a circuit diagram for a selector-transmitter for the variable pulse system of Fig. 2;

Fig. 2—B is a circuit diagram for a receiving selector unit cooperable with the transmitter of Fig. 2—A;

Fig. 3—A is a circuit diagram for a selector-transmitter for the phase-shift system depicted in Fig. 3;

Fig. 3—B is a circuit diagram for a receiving selector unit cooperable with the phase-shift transmitter of Fig. 3—A;

Fig. 4—A is a circuit diagram for a shaped-wave phase-shift receiving selector cooperable, for example, with the transmitter of Fig. 3—A;

Fig. 5 is a circuit diagram of a modified phase-shift transmitter and receiving selector utilizing a metallic circuit without high-frequency carrier.

Generalized description

Figure 1:
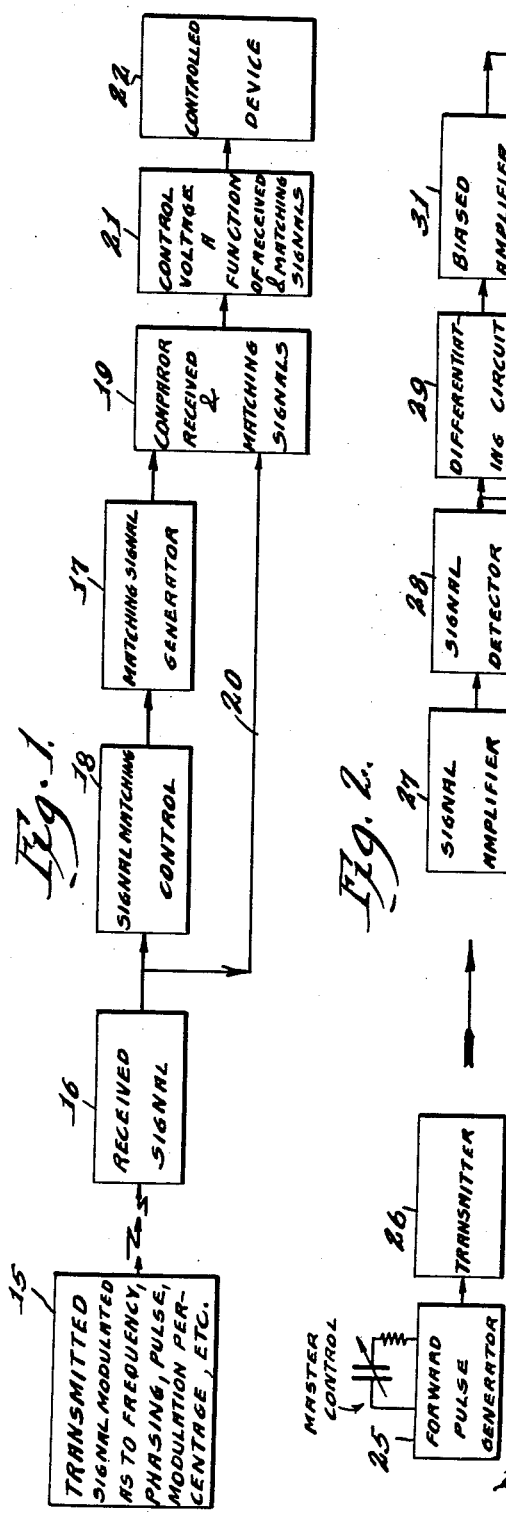
Fig. 1 is a block diagram of the remote control system in its broader aspects.

Broadly, the functional aspects of the novel remote control system are depicted in Fig. 1, wherein a characteristic control signal is emitted from the block source 15 and transmitted by any medium to the remote point.

The characteristic of the control signal may be that of modulation as to frequency, phasing, pulse duration, sequence, polarity, percentage of modulation, repetition rate of pulses, or combinations of these control criteria; and in general, it is contemplated that the preferred transmission medium may be a metallic circuit, such as the commercial power lines, for reasons heretofore and hereinafter alluded to, it being understood, nevertheless, that other media are practicable and contemplated, especially space wave propagation at radio frequencies.

As indicated by block 16, Fig. 1, the received signal is utilized to control the operation of a source of matching signal energy, designated as the matching signal generator of block 17, through the medium of a control circuit means 18.

If the incoming signal is characteristically modulated as to pulse duration, then it is the function of generating means 17 to produce signals the duration of which is progressively varied above and below some limiting value, and these local signals are fed into a comparer 19, along with the actual incoming signals by-passed along path 20.

The local generating means 17 will continue to produce signals of different pulse length until the generated signal is identical in duration to the incoming control signal, at which time there is in effect a zero resultant control voltage, preferably, which may be utilized in various ways to actuate the controlled device of block 22.

The aforesaid control voltage, as represented in block 21, is some function of the incoming and locally generated signal voltages as these are mutually effective in the comparer, it being apparent that the resultant control voltage may be zero or different from zero, for control purposes.

Pulse duration system

In Fig. 2 there are depicted diagrammatically the components of a remote control system utilizing pulse duration as the control characteristic. A forward pulse generator 25 produces pulses having a predetermined duration, as selectively varied for example by the "Master Control" means there-indicated, and pulses of this duration are propagated or directed to the remote control point or receiving station by transmitter means 26. In conjunction with the forward pulse generator, the master control is depicted schematically as a phase-shifting network, it being contemplated, as will more particularly appear hereinafter, that the limiting values of the pulse duration may conveniently be set between the beginning and end of a single cycle of commercial power line voltage, at 60 cycles for example, and the duration of such pulse may be controlled selectively by applying an effective voltage at an instant during said cycle, determined by said phase-shifting network, to the control grid of a thermionic pulse generator or an oscillator.

The transmitted pulse from the control station is suitably amplified by means 27 at the remote point, and rectified in signal detecting unit 28 to provide a positive incoming pulse for both control and comparison purposes; and this pulse is fed to a differentiating circuit means 29 and also to a comparer circuit means 30.

The differentiating means, as will appear more particularly in the circuit description, functions to produce a short triggering pulse for control of the local matching signal generator 32, which pulse is amplified in unit 31.

The local generating means 32 is preferably a single-cycle multivibrator adapted to produce in rapid succession, short pulses the duration of which may be varied by varying a circuit component, such as the capacity 33, to produce what is preferably referred to as the reverse pulse, which is fed into the comparer circuit means 30, along with the positive incoming pulse component from the detector stage 28.

If the incoming forward pulse and the locally generated reverse pulse are of substantially identical time duration, a thermionic control circuit or rectifier 34, actuated by the resultant control voltages from the comparer 30, will cause a master control motor 35 to stop. This motor is coupled to the reverse pulse generator control or capacity 33 to vary the latter so long as the motor runs in one or the other direction, which it will continue to do so long as the forward and reverse pulses are not identical. It will be apparent that the control motor 35 must always rotate predetermined amounts between opposite, fixed limits corresponding to positions of the capacity control 33 to effect matching the local with incoming signals, by reason of which this motor may also be utilized to control a desired device, such as a phonograph selector switch or the like.

In Fig. 2—A is shown a wiring diagram for a selective control unit for transmitting pulses of selectively varied duration in conjunction with a phonograph control system, the transmission medium in this instance being the commercial power lines 40 supplying 60 cycle current to the primary 41 of a power transformer, one secondary winding 42 of which supplies plate potential via lead 43 and R. F. choke 44 to the plate 45 of a thermionic oscillator tube, the plate circuit being completed to the cathode 46 mainly via leads 47, coin switch 48, closed momentarily by deposit of a coin in the usual coin control (not shown) provided for phonograph selectors, and conductor 49 back to said high-potential secondary winding 42 through the winding 50 of a locking relay and conductor 51.

The momentary flow of plate current in the aforesaid plate circuit will cause the locking relay to pull up and close its own interlock circuit via contacts 52, normally closed contacts 53—54 and cathode lead 47, a timing capacity 55 being shunted across relay winding 50 through relay contacts 56, so that the relay continues to hold up although plate current is flowing only during half-wave intervals of the 60 cycle supply voltage.

The grid circuit of the oscillator tube, from grid 58 connects through grid condenser and leak 59 to one terminal 60 of a tank inductance, the opposite terminal 61 of which is coupled through capacity 62 to plate 45, and via conductor 63 and line coupling capacity 64 to one side of the power lines 40. This grid circuit is completed to cathode from tap 66 on the tank coil via conductor 67 and radio frequency capacitor 68 to cathode 46, the tank coil being tuned to the desired line transmission frequency by shunt capacitor 69.

Normally, contacts 70, ganged with contact 54, are closed to complete a short circuit around grid inductance 60—66 via conductors 67A and 71, as a result of which the oscillation of the aforesaid circuit is prevented until such time as one of the selector push buttons 72A, 72B . . . 72G is depressed for purposes of effecting a phonographic selection.

When the locking relay has its coil 50 energized as aforesaid, following deposit of a coin, a mechanical interlock (indicated schematically by the dash-dot line, switches 54, 70) is set up by which any of the push buttons 72A . . . 72G depressed will be locked in set or closed condition; and as one result of the selective depression and locking-in of, say, the push button 72B, switch contact 54 will be transferred from contact 53 to contact 53A, and also, contacts 70 will be opened, lifting the short-circuit around grid inductance 60—66, so that the oscillator circuit may now oscillate during appropriate half-wave intervals of the supply frequency.

As another important incident of setting of selector push button 72B as aforesaid, contacts 73B thereof close, thereby connecting the tank coil cathode lead 67 through a phase-shifting resistor 74B, conductor 75 to one terminal of a phase-shift grid-bias secondary winding 76 of the aforesaid power transformer, the remaining terminal of which winding connects via conductor 77 and series phase-shift capacity 78, conductor 79, and phase-shift resistors 74H, 74G . . . . 74C to the depressed push button contacts 73B, by reason of which a grid-biasing voltage is applied to conductor 67A from winding 76, the phase of which is shifted (in a predetermined amount dependent upon the values of phase-shifting components 78 and the connection to the resistor network 74B . . . . 74H; relative to the plate voltage.

As a result of applying a selectively phased grid bias to the oscillator during intervals of oscillation as aforesaid, radio frequency impulses of selected duration are impressed upon the power lines 40 through coupling means or capacities 64, 65, to be picked up by remotely situated receiving and selecting apparatus now to be described.

A plurality of selecting pulses of predetermined duration will be impressed upon the transmission medium or power lines following depression of one of the selection push buttons as aforesaid, these pulses following in very rapid succession for a determined length of time considered adequate to assure response at the remote controlled station, said length of time being dependent upon the time required for the timing capacity 55 to discharge, it being recalled that as an incident to depression of a push button, contact 54 transferred to contact 53A, thereby shunting the cathode return 47 around relay winding 50 via contacts 53B and lead 53C to conductor 51. As soon as the relay falls back, both the electrical and mechanical interlocks set up thereby are broken, with the result that contacts 70, controlling oscillation, and contact 54, are restored to normal condition, awaiting the next coin-operation of the control unit, and the particular push button which had been depressed and locked down, is freed and normalized.

In Figure 2—B is shown a circuit diagram of a pulse-duration selecting means, wherein the pulse generating and transmitting means indicated diagrammatically in blocks 80 and 81 apply a selecting pulse at radio frequency, for example, to power lines 40, from which the pulse signals are picked up by suitable coupling means, e. g. the line coupling capacities indicated, and passed through a suitable amplifying means 82, preferably, before rectification by the usual signal detecting means 83.

The rectified incoming selecting pulses are fed to a differentiating means through coupling transformer 84, said means consisting in this instance of capacity 85 and resistance 86 calculated to give a time constant resulting in a very short pulse for triggering the local pulse generating means, this triggering pulse being coupled via conductors 87 to the grid-cathode circuit, including bias potential means 88, of biased amplifier means 89.

The differential triggering pulse, after amplification by the biased amplifying means 89, is applied via conductor 90 to the grid 91, of one of a pair of triodes in the local signal generator, through coupling capacity 92, cathode 93 for this triode being returned to the common ground 94.

The local signal-matching generating means is depicted as a form of single cycle multivibrator in which pulse changes in the circuit 95 of first triode plate 96 are coupled through a variable capacity 97 to the control grid 98 of a second triode, which is coupled through parallel capacity 99 and resistance 100 to the generator output lead 101, along with the grid 91 of the first triode. Capacity 97 controls the duration of each pulse generated by this signal-matching means, responsive to triggering impulses from the differentiator, and said capacity is arranged to be progressively, and in a sense retrogressively, varied by means such as the motor 105, which, as will appear, is connected to run in opposite directions so long as the incoming and locally generated signals do not match in duration.

Means for comparing the locally generated matching signal and the incoming control signal includes a comparer consisting of a first gas triode or Thyratron $V_1$, the control grid 106 of which is coupled through capacity 107, conductor 108, to the line side of differentiator capacity 85, so that the same signal utilized for triggering is impressed upon the grid of the first gas triode to fire the latter, while the local matching signal is applied from generator output lead 101 through capacity 109 to the control grid 110 of a second gas triode $V_2$ in the comparer to fire the same. The plates of both triodes $V_1$ and $V_2$ are supplied from a quenching supply voltage source 111 of suitably high frequency, for example about 420 cycles, adequate to provide rapid restoration of the two comparer triodes in comparison with the pulse frequency.

The plates 114 and 115 of gas triodes $V_1$ and $V_2$, respectively, are connected to terminals 116 and 117 of an anode supply transformer whose primary 118 is connected to the aforesaid quenching supply frequency source 111, secondary connection 117 being a center tap which connects through bridge resistor means 119 to said plate 115 and also to the cathode 120 of triode $V_1$, said resistor being grounded as at 121, and each bridge resistance section being shunted by capacity 122, while the third terminal of said transformer connects to the cathode 123 of triode $V_2$.

The outer terminals of the bridge resistor arms connect respectively via conductors 124 and 125 to control grids 126 and 127 of a second pair of gas triodes $T_1$ and $T_2$ constituting the Master Motor Control unit, so-designated, Fig. 2—B, said grids being connected together through the arms of bridge resistor means 129. A biasing voltage supply 130 is connected, positive, to cathodes 131 and 132 of the second pair of triodes, and negative to the common connection of the arms of the second bridge resistor means 129 and to ground at 133.

The anode supply voltage for the plates of the second set of gas triodes is procured from the secondary windings 136 and 137 of a transformer whose primary 138 is supplied from the 60 cycle mains, said windings 136 and 137 having a common center tap connection 139 to ground and being respectively connected through motor field windings 136A and 137A to plates 134 and 135; thus, plate current flowing in either triode $T_1$ or $T_2$ will excite the corresponding field winding of the Reversible Master Motor 105.

By reason of the normal biasing voltage from source 130, both of the second Master Control triodes $T_1$ and $T_2$ are normally quenched, so that the motor fields are not excited and the motor 105 is at rest; however, an effective positive grid voltage in either arm of the bridge resistor means 119, 129, 121, 133, will fire the corresponding triode, with a resultant excitation of the corresponding field winding 136A or 137A and consequent armature rotation in a certain direction depending upon the poling of the armature supply voltage 140.

An incoming control signal impressed upon the grid of comparer triode $V_1$ would cause control triode $T_1$ to fire, and the consequent plate current flow through motor winding 137A would start the master motor in a first direction, with a consequent progressive change in the capacity of variable control means or condenser 97 of the local generator.

The same incoming control signal would trigger said local generator and the pulse generated thereby would be impressed upon the control grid of the second comparer tube $V_2$ in phase with the signal voltage applied to tube $V_1$, so that under the incoming and locally generated pulses, the comparer triodes are fired and restored simultaneously in very rapid succession if the said pulses are identical in length, under which condition, the resultant voltage in the bridge circuit 119, 121, 129, 133, is effectively zero, in consequence of which neither control triode $T_1$ or $T_2$ would fire, and motor 105 would be at rest.

However, so long as the incoming and locally generated pulses are of different duration, the aforesaid bridge circuit will be in effect unbalanced with a resultant control voltage that will fire one or the other control triode $T_1$ or $T_2$, and the master motor will run until variable control means 97 tunes the local pulse generating means to produce the identical pulse necessary to match the incoming pulse for a zero resultant control voltage in the bridge circuit. In this connection, it is important to notice that the direction of rotation of motor 105 is correlated to the operation of generator capacity 97 and the relative firing relationship of tubes $V_1$—$T_1$ and $V_2$—$T_2$ such that the relative displacement of capacity 97 will tend to shorten the duration of the local pulse if the latter is too long, and vice versa.

The pulse-duration embodiment of the invention hereinabove described in view of Figs. 2, 2A, 2B, may be utilized to control any desired device or instrumentality, preferably by interconnecting such device with the driving link, indicated by the dash-dot line 142, Fig. 2B, which connects motor 105 with pulse duration control means 97, as depicted schematically by the block controlled device 143 and link line 144.

Phase-shift selective system

Depicted in Fig. 3 by block diagram are components of an embodiment of the invention utilizing phase-shifted selecting signals, preferably modulating radio frequency carrier current applied to the commercial 60 cycle power lines for controlling instrumentalities at the remote station.

To this end, a source of radio frequency carrier current 150 at the remote selecting station is applied to the transmission medium, here the power lines 151, at a frequency for example of 185 kc., this energy being modulated by selecting signals from a selective phase-shifting signal control means 152, for which the phase-shift reference standard is the 60 cycle line voltage as indicated at 154.

At the controlled or receiving station, a resonant filter means 155 is preferably included ahead of an input signal amplifier, 156, both the filter and amplifier being tuned or peaked critically at the carrier frequency of 185 kc. to eliminate or suppress transients and spurious signals, and the incoming carrier is rectified or detected by the means 157 for derivation of the positive signal pulses which are then impressed upon a 60 cycle phase discriminating means 158, as well as upon a 60 cycle rectifying means 159 which controls certain control relay means 160 and 161 functioning ultimately to energize or close the local selector circuit indicated at 162 cooperatively with a local Thyratron-controlled rotary switch means 163 actuating a local 60 cycle phase-shift network means 164 (operating preferably step-by-step through interrupter switch means 165 cooperative with the Thyratron switch means).

By way of general description of operation of the system shown in Fig. 3, it may be assumed that the 60 cycle power lines 154, 154', and 154'' are part of the same commercial feeding line, which therefore in this case is both the transmission agency or medium and the phase-shift reference standard.

Assuming that a certain selection is made at the controlling station by means of the signal control 152, Fig. 3, an R. F. frequency will be impressed upon the power lines aforesaid by the 185 kc. oscillator means 150, and this R. F. carrier is modulated by the 60 cycle selecting frequency in which the phase of the modulating voltage depends upon the selection made by control 152.

The aforesaid 185 kc. carrier, thus modulated, is passed from the power lines by filter 155 and amplified by means 156, and the positive half (preferably) of the amplified signal is detected by means 157 for derivation of a selecting signal voltage, which in turn is passed into the discriminator 158 and also to rectifying means 159.

So long as there is a signal voltage component acting in the discriminator output circuit, the Thyratron controlled switch 163 will continue to step cooperatively with interrupter switch means 165, with a consequent progressive shifting of phase constants in the network means 164, there being an a. c. line voltage fed into the phase-shifting network from line source 154', and this line voltage, modified as to phase, is equivalent to a locally generated signal, which is fed into the discriminator for comparison with the phase characteristic of the incoming selecting or control signal.

At such time as the local phase-shifted signal and the incoming phasally characteristic signal are or become identical, there will be no resultant voltage component in the discriminator output network—in other words, there will be a null, by reason of which the stepping switch means 163 stops and the control relay means 160, 161, complete their control functions to cause a closure or energization of the selector circuit 162.

Referring to Fig. 3—A, showing a transmission-selector control unit of the phase-shift type suitable for use in conjunction with the system of Fig. 3, there are provided a plurality of selecting push buttons 170, usually twelve to twenty-four in number for adaptation of the system to control of an automatic, coin-operated phonograph, and these push buttons are preferably of a known type adapted to lock, when depressed, and to be released from locked or selecting position by shifting of means such as the lock bar 171.

Each said push button is operatively linked with phase-shifting means such as the variable resistance 172 in series with phase-shifting capacity means 173 and secondary winding 174 of a transformer whose primary 175 is connected to commercial power line leads 176 and 177, over which the control or selecting signals will be transmitted to a remote receiving selector means or station 180.

A locking relay 181 is connected to line 176 through rectifying means 198 and R. F. choke means 199. The other side of the locking relay 181 is connectable to line 177 through a coin operated or controlled switch 178 closable from normally open condition to complete the circuit via lead 177A to the main power line conductors 177. When the coin switch 178 is closed, the locking relay 181 is energized long enough to lock itself mechanically and close its contacts 182 and 183, the latter closing an operating circuit for latch bar solenoid 184, thereby releasing the push button latch bar means 171 to restore any and all push buttons to normal or non-selecting positions.

Following coin operation of switch 178 and release of all push buttons 170 as aforesaid, a selection may be made by depressing one of said push buttons, which becomes locked by lock bar means 171 with a consequent closure of contacts 185, which, together with now locked contact 182, shunts out the cathode resistor 186 of a gas triode or Thyratron 187, and thereby affording a low-resistance cathode return, via said contacts 185, 182, to connection 188 with conductor 177, and via lead 189 from an R. F. amplifier cathode 190, thereby causing radio frequency energy at 185 k. c. to be placed on the transmission line conductors 176 and 177, as will presently appear.

As a further result of closure of contacts 182, 185, a timing circuit, including condenser 191 and resistance 192 is rendered effective in that the condenser 191 is permitted to discharge slowly through said resistance, thereby impressing a high negative bias on the grid 193 of the Thyratron 187, preventing the latter from firing.

The 185 k. c. carrier frequency is supplied by oscillator tube 194, whose plate 195 is energized through resistors 196, 197, and rectifying means 198, through radio frequency choke means 199, and power line lead 176, cathode 200, as well as cathode 201 of the companion modulator tube, being connected through resistor 202, lead 203 to the other line lead 177, while the plate of the modulator tube, 204 is fed through dropping resistor 205 from the supply to plate 195.

The control grid 206 of the modulator tube has impressed thereon a selective or characteristic phase-shift voltage from the network means 172, 173 and line voltage source 174, which may be a winding on the filament transformer supplying the tubes of this unit, the primary winding 174A of which is energized from line leads 176 and 177, there being a return lead 174B from center tap on secondary winding 174 to lead 177 for the modulating voltage.

Tuning of the carrier energy to the desired frequency, e. g. 185 k. c., is effected by a tank circuit including inductance 210 and capacity 211 connected to grid 212 of an R. F. amplifying tube via conductor 213, which grid is returned to ground via conductor 189 and contacts 182, 185, closed. Amplifier grid 212 is also looped via lead 214 with the control grid 215 of the oscillator tube, the latter grid being coupled through capacity 216 to plate 204 of the phase-shifter modulator tube, it being understood in this connection that the carrier here is amplitude-modulated, and the signal is phasally modulated or varied.

The system in this form can also be frequency modulated if desired, in which case the tank circuit combination 210—211 is substituted for capacity 216 and a return resistance substituted for the tank between conductors 189 and 213.

The amplified, phased-modulation (to distinguish from the ordinary phase-modulation of a carrier as a form of frequency modulation) carrier energy is transferred to the transmission line through R. F. transformer 217, the primary of which is in the power circuit for plate 218 of the amplifier, and the secondary of which connects via conductor 219 with power line lead 177, and via coupling capacity 220 with power line lead 176, from which the phased-modulation carrier is passed onto the main power lines 179, along with similar signal energy from other selector control units 221, etc. connected with the same power lines to selectively control the operation of automatic phonograph means 222, through agency of the receiving selector means indicated schematically at 180, Fig. 3—A, the function of which is to produce a local signal varying progressively between certain limits in phasal characteristic until the phasal characteristic of the incoming control or selecting signal is matched exactly to cause selection of the desired phonographic number corresponding to the particular phasal identity of the local matching signal.

When the selector switch or button lock release is actuated responsive to energization of coil 184 as aforesaid, following initial coin-operation of the lock relay 181, the latter remains locked, but the operation of the latter in closing release contacts 183 is only momentary, and nothing happens until one of the selecting buttons 170 is pushed, to become mechanically locked in operated condition again and also to close contacts 185, thereby completing the aforesaid shunt around cathode resistor 186.

After a predetermined time, timing capacity 191 will have discharged sufficiently through contacts 185, closed, to reduce the negative bias on the tube 193 to permit the latter to fire, thereby again momentarily closing release contacts 183 so that the latch bar 171 is again tripped to release the selected button, and accordingly, contacts 185 are opened, restoring resistor 186 and interrupting the emission of the signal. For this purpose, relay 181 is an impulse type, locking relay which only momentarily closes contacts 183, but will hold contacts 182 locked closed.

*Receiving phase-shift selector means*

The receiving selector means depicted by block diagram at 180 in Fig. 3—A is shown in detail in Fig. 3—B, wherein the selecting or control signals incoming from one or another of the remote control stations, are picked up from the power line leads 179 through coupling capacities 225, amplified by R. F. amplifier means 226, and passed through coupling transformer 227 to plate 228 and cathode 229 of a demodulator or detector to reproduce the original phasally modulated signal separate from the carrier, the secondary of input transformer 227 being tuned by capacity 230 to the carrier frequency, and completing the rectifying plate circuit through dropping resistor 231, suitably by-passed at 232, through the primary 233 of a coupling transformer, to the cathode 229.

The demodulated signal voltage appearing across the secondary winding 234 is impressed upon plates 235 and 236 of a pair of diodes forming part of a 60-cycle phase discriminator, the cathodes 235A and 236A of which respectively connect to the control grids 237 and 238 of a pair of gas triodes or Thyratrons or relay tubes, said grids being negatively biased by battery or source 239 connected between cathode lead 240 and the center tap of resistance 239A.

Cathode lead 240 is connected to stepping switch interrupter terminal 241, normally in closed circuit condition with stepping switch interrupter contact 242, grounded at 243, and also connected through the stepping switch coil 245 to the negative terminal of the plate supply or battery 244 for the Thyratrons.

The demodulated signal energy applied to discriminator plates 235 and 236 appears as a positive D. C. voltage across the load resistors 235B and 236B in opposition to the negative biasing voltage of battery 239 to swing the control grids 237 and 238 of the Thyratrons positive and fire the relay tubes so long as there continues to be sufficient voltage across said load resistors, which is the case until the local matching signal generator operates selectively to nullify said firing voltage.

Each time the gas triodes or Thyratrons fire as aforesaid, the stepping switch coil 245 is energized to actuate the interrupter switch contact 242, as well as the phase-shift selector wiper 250 and the record selector switch wiper 260, it being apparent that each opening of contact 242 from the normal contact 241 interrupts the cathode-plate circuit of the Thyratrons and quenches the latter, and since the selecting signals come in rapid succession, the tubes are rapidly fired and restored, and stepping switch coil 245 is rapidly pulsed to step the wipers around their respective banks of contacts.

Assuming that twelve selecting positions are required, corresponding for example to twelve phonograph record selections, wiper 250 will traverse twelve contacts 251, each connecting with one terminal of a phase-shifting means, such as resistors 252, the remaining terminals of which are all commoned to conductor 253 leading to one terminal of a 60-cycle voltage source, which in this instance is the secondary of a transformer, indicated at 254, the primary 255 of which is connected to the power mains 179.

The remaining transformer secondary terminal 256 connects to another phase-shift component or means such as the capacity 257, connecting via lead 258 to center tap 234A on the secondary of the discriminator input transformer, and voltage source secondary winding 254 has center tap 254A connected via conductor 259 to the mid-tap 235C of the discriminator load resistors, as a result of which a local signal having a phase angle selectively determined by the position of wiper 250 on the bank of resistor contacts 251, is applied to the phase discriminator circuit at points 234A and 235C.

In the example disclosed, only twelve selecting intervals are required; however, a much larger number may be had. In general, the values for the several resistors 252, with regard to their calculated effect, in conjunction with capacity 257, on the phase angle, are chosen to afford a maximum interval separation between each step in the bank. Thus, as wiper 250 steps over contact bank 251 responsive to signal-initiated firing and quenching of the gas triodes, it will lodge on a contact 251 the corresponding resistance 252 for which, in cooperation with capacity 257, will result in the application of a local signal voltage substantially identical in phase angle to the incoming, demodulated, signal voltage, by reason of which any triggering or firing voltage existing in the Thyratron or relay tube inputs circuit is nulled, and the stepping switch remains at rest with phase-shift wiper 250 on a particular contact in the bank, and with phonograph selector wiper 260 on a correlated and particular contact in its bank 261, awaiting the final selecting operation determined by certain control relay means now to be described.

A first control relay having one terminal 270 of its winding connected to the plate 271 of a control tube or rectifier, has its remaining terminal 272 connected via conductor 273 and normally closed contacts 274 of a second control relay, in series via lead 275 with plate supply source or battery 276 to cathode 277, such that plate current flowing in said control tube will cause said first control relay to pull up. However, the control grid 278 of said control tube connects through resistor 279 to the negative terminal of bias battery or source 280, which normally suppresses plate current flow in said tube, so that the control relays are idle and normal while incoming selecting signals are received, until the local generator matches signals.

Control grid 278 connects via conductor 281 and resistor 282 to demodulator resistor 231, deriving from the latter a positive voltage component of the diode current, which is thus applied to the control grid of the control or rectifier tube with the object of charging condenser 283, shunted between grid 278 and the negative bias terminal, and grounded at 284.

However, the charging effect of each positive diode voltage pulse is nullified by operations of the interrupter switch and closures of contact 242 with contact 286, thus applying ground from 243, via conductor 285, to the normally ungrounded terminal of condenser 283, so that the latter is prevented from charging up to potential sufficient to effect substantial plate current flow in the circuit of plate 271.

When the selective operation of the phase-shifting means is completed by signal-matching as aforesaid, interrupter switch 242 remains at rest, normal on contact 241, and condenser 283 has an opportunity to charge up under continued positive pulsing from the incoming signal energy in the demodulator circuit, and very quickly reaches a potential sufficient to overcome bias 280 with a resultant flow of plate current through the winding of the first control relay at 270, 272, as a result of which contacts 290 close, applying battery from plate supply 276, via conductors 291, 292 to terminal 293 of the second control relay coil, the remaining terminal 294 of which also connects with plate 271, so that the second relay pulls up, opening contacts 274 and thereby cutting the first control relay out of the plate circuit, while simultaneously closing contacts 295 to lock-in a holding circuit from second relay coil terminal 293, via conductors 296, 291 to plate supply source 276.

As a result of the initial pulling up of said first control relay, its contacts 297 were closed, thereby completing circuit via conductors 298, between battery or power source 299, wiper 260, and the particular selector coil 300 contacted by said wiper, thereby causing the automatic phonograph means 301 to play the selected number.

Another result of initial energization of said first control relay is the closure of lock-out contacts 302, which places a shunt, via conductors 303, across the grid input circuit for the Thyratrons, thereby shorting out all impulses from the discriminator so that the relay tubes cannot possibly fire for the remaining duration of the incoming selecting signals, once a selection has been made.

As soon as said first control relay drops back, upon operation of the second control relay, as aforesaid, first lock-out contacts 302 open, but not before a second lock-out pair 304 closes, placing the same lockout shunt via conductors 303 on the grids of the Thyratrons.

As soon as the incoming selecting signals cease, condenser 283 bleeds off quickly through resistor 279, and plate current is again suppressed by bias 280, so that the second and locked-in control relay falls back, and the selecting means is in readiness for the next selecting operation.

*Direct-comparison phase-shift system*

In Fig. 4 is shown by block diagram a modification of the selective means of Fig. 3—B, which is likewise adapted for cooperation with the transmitter-selector control unit shown in Fig. 3—A.

Incoming signals, preferably filtered and amplified, as by means 155, 156, Fig. 3, are detected or rectified for demodulation purposes by means indicated in block 400, which may correspond to block 157 of Fig. 3, and the signal is then passed to a depolarizing bridge 401, which in effect doubles the signal frequency and affords a uni-directional signal voltage of desired polarity without regard to poling of the power line connection.

From the depolarizing bridge, the incoming selecting signals are shaped as to wave form by signal-shaping means 402 to provide substantially square-wave pulses of optimum matching form.

Means locally generating matching signals includes a source of alternating voltage of the same frequency as the modulating source, derived in this instance from the power lines 179 via transformer 404, the secondary voltage of which is phasally modified by phase-shifting means generally indicated at 405, and which voltage is passed through depolarizing means 406, such that uni-directional pulses of line frequency and desired polarity are produced for square-wave shaping by means 407.

The shaped incoming and local pulses from means 402 and 407 are both applied to selecting relay means 408, in accordance with the direct comparison method hereinafter explained, such relay means being for example a Thyratron valve, and the pulses being in opposition, such that if they are also in phase, the relay means 408 is not actuated, whereupon the control relay means 403, by 410, pulses 409 for selected operation of the controlled device, such as phonograph 222, Fig. 3—A, or 301, Fig. 3—B. Should the two signals not match in phase, however, then the phase-shifting means would continue to operate until they did match, following which, selection would be made.

Referring to the circuit diagram of Fig. 4—A, the incoming phase-shift selecting signals from line 179 are amplified by means 415 and demodulated by means 416, which may be the usual rectifying means or a discriminating network, depending upon whether the incoming carrier energy is amplitude or frequency modulated.

The demodulated incoming signal energy is applied to a depolarizing rectifier network or bridge 417, one output terminal 418 of which is connected to control grid 420 of signal shaper-amplifier 421, the other output terminal 419 of said bridge being connected to the common ground 422, along with cathode 423. The incoming signal energy is further shaped and amplified by tube 424, whose control grid 425 is coupled by capacity 426 to plate 427 of the preceding stage; plates 427 and 428 are connected through dropping resistors 429 to the common plate supply lead 430.

Shaper plate 428 is coupled by capacity 431 to the control grid 432 of the last shaping tube 433, and also through series capacity 431A to the control grid 434 of a relay control tube 435, the incoming signals being amplified as well as shaped to square-wave form, as aforesaid, and applied to the input of the relay control tube, the plate 436 of which connects via conductor 437 to one terminal 348 of control relay winding 439, in series through terminals 440 with a second control relay winding 441 the remaining terminal 442 of which connects via lead 430A to the common plate supply conductor 430.

Amplifier-shaped cathodes 423, 424A, and 433A are returned to common ground 422, cathode 433A being connected to ground at 517 through the lock-out normal contacts 516X of phonograph control relay 439; but the relay control tube cathode 435A is grounded through a variable resistor 443 for sensitivity adjustment of this stage in actuating (and dropping out) the control relays in the plate circuit thereof, such that relay windings 439 and 441 will be adequately and not marginally energized by plate current flow to cause said relays to pull up positively and at once upon matching of selecting signals. All control grids are returned to ground through resistors 445.

The plate 446 of the shaper tube 433 connects through resistor 447, lead 448, to plate 449 of the local matching shaper tube 450, which plate in turn connects through dropping resistor 451 to the positive plate supply lead 430A, it being pointed out at this juncture, that the outputs of both signal or pulse shaping circuits are therefore directly brought together at junction 452, and in this sense are directly compared, as distinguished, for example, from comparison in a network or discriminator means of the type employed in the circuit of Fig. 3—B.

Locally generated matching pulses are derived from a frequency standard source, such as the power mains 179, over which the incoming selecting-signal energy or carrier may be assumed to be transmitted, transformer 460 having its primary 461 connected to said mains, and its secondary 462 shunted by center-tapped resistor 463, with one terminal of said resistor connecting to capacity 464 as one element of a phase-shifting means, and the remaining terminal of said resistor connecting in common at bus jumper 465 with one terminal of each of a plurality of phase-shift resistors 466, the number of which is the same as the number of selecting positions or operations the device is intended to make, for example, twelve in the case of a twelve-record phonograph selector mechanism. The remaining terminal of each of said phase-shift resistors connects with a contact 467 in a switch bank, to be engaged step-by-step by switch wiper contact 468, which is connected at 469 to capacity 464, and at 470 to one input terminal of the local depolarizing bridge.

Center tap 471 of shunt resistor 463 connects via conductor 472 to the remaining input terminal 473 of said bridge. Thus, a local matching voltage is applied to the depolarizing bridge, and the phase angle of this voltage is determined selectively by the position of the wiper 468 on the bank of phase-shift resistor contacts 467, such that a particular value of resistance is in series with capacity 464 as a phase-shifting network across the transformer secondary 462 depending upon the position to which said wiper has been stepped by operation of stepping switch means shortly to be described.

One output terminal 475 of the depolarizing bridge connects to common ground at 476, while the remaining terminal of the output connects via conductor 477 to control grid 478 of shaper-amplifier 479, the plate 480 of which connects through resistor 481 to positive plate supply branch 430A and is coupled through capacity 482 to control grid 483 of the local or reference shaper tube 450, so that the local pulses, at double line frequency, are squared conformably to the shaping of the incoming pulses at like frequency, said pulses being present at juncture 452 simultaneously, in a manner of speaking, but in opposing sign, such that if the respective pulse voltages are in phase, there will be a minimum resultant voltage at the comparing juncture 452, but if the pulses are not of identical phase angle, or substantially so, the resultant voltage at said juncture will be sufficient to actuate the selecting relay means, which in this case is a gas tetrode or Thyratron 490.

The aforesaid selecting relay means or Thyratron 490 includes in its plate circuit the winding 491 of a stepping switch mechanism, which actuates the phase-shift wiper contact 468 in step with a similar switch wiper 492 for the phonograph (or other) selector switch. One terminal 493 of said winding connects with the positive plate supply lead 430, and the remaining terminal of this coil, 494, connects normally through step switch contacts 495, 496, conductor 497, with plate 498; thus, each time the selecting relay Thyratron fires, step switch coil 491 is energized to actuate the associated stepping mechanism (not shown) and cause wipers 468 and 492 to advance one step or contact in unison, and to cause step switch contacts 495—496 to open, thus opening the plate circuit for the Thyratron and quenching the same, plate lead contact 496 at this time closing with contact 499 shorting plate 498 directly to cathode 500 around a de-ionization capacity 501 to hasten the complete restoration and quenching of the Thyratron, in view of the rapidity of the selecting pulsations, and the corresponding normalization of the stepping switch mechanism and contact system.

For increased sensitivity and simplification of equipment by elimination of amplifying means otherwise necessary, the relay tube 490 is a tetrode having a shield grid 502 tied to the cathode 500, said latter elements connecting through resistor 503 to terminal 493 on the hot side or plate voltage supply side of relay winding 491, said resistor 503 being calculated to permit a slight cathode current so that there will be adequate biasing voltage drop to bias the control grid 504 negatively.

Application of the resultant comparison voltages present at junction 452 of the two pulse-squaring shaper circuits, is effected through capacity 505, which connects by conductor 506 to the cathode 500 of the gas tetrode relay tube to apply a negative voltage thereto adequate to swing the control grid positive and fire the tube.

The reference or standard matching pulse generating means is poled so that its pulse voltages, alone in the absence of incoming selecting pulses, will not be of polarity to fire the relay tube.

So long as the incoming and locally generated pulses are not substantially identical in phase, there will be a resultant voltage adequate to fire the Thyratron 490 repeatedly for the duration of incoming signals, with a consequent repeated stepping of wipers 468 and 492; and as the former lodges in succession upon different contacts 467, different values of phase-shifting circuit component or, in this instance, resistance, will be connected in circuit with component or capacity 464, and this operation will continue until the phase angles of the local and incoming pulses are substantially identical, at which time there will be no resultant effective voltage adequate to fire the selecting relay or Thyratron 490, with the result that the stepping switch will remain at rest with the contact wiper 492 on a particular one of its bank of contacts 509, thereby connecting a particular selector coil or solenoid 510 in an operating circuit including power source or battery 511, grounded at 512, wiper 492, conductor 513, control relay contacts 514, conductor 515, and first control relay contacts 516 to ground 517, for energization of the particular coil or solenoid selected so soon as the first and second control relays become energized following completion of the selecting operation.

When the incoming carrier or selecting signal energy arrives, the stepping switch at once starts to step, which results in repeated closing and opening of relay shorting switch contacts 520 on the stepping switch, so that plate supply voltage from conductor 430A is applied directly to the plate 436 of the relay control tube at junction 521 via conductor 522, thereby preventing operation of relays 439 and 441, both of the latter being shunted by condensers 522 and 523, respectively, such that they do not immediately pull up or drop out.

When the selecting pulses are matched, the stepping switch remains at rest and shorting contacts 520 remain open, so that the two control relay windings 439 and 441 have time to become energized by building up of the necessary charge in their respective shunting condensers; but condenser capacity 522 is different from that of 523, and the first relay 439 pulls up ahead of the second relay, so that contacts 516 close before second relay contacts 514 open, whereby the necessary operating ground for selecting wiper 492 is completed momentarily, and the phonograph or other controlled instrumentality is selectively actuated as a result of energization of a particular one of the coils or solenoids 510.

So long as the incoming signals continue to be received, said pair of control relays 439 and 441 will continue to be energized by flow of plate current in tube 435 after the signals are matched and the selection is made, in which case the stepping switch is at rest and its shorting contacts 520 are open; and so long as the first control relay 439 is thus energized, its normal contacts 516X will remain open, thus interrupting the cathode return circuit to ground for the last stage of the incoming signal shaping means, i. e. cathode 433A, conductor 524 to ground 517; thus, once the selection is made, incoming signals are locked out and no incoming pulses are delivered to juncture 452.

However, as soon as the incoming signals cease, relay control tube 435 will no longer be impulsed, and the pair of control relays 439 and 441 will drop out, breaking the lockout and normalizing the system for reception of the next selecting signals.

In the event that the carrier of the selector control unit shown in Fig. 3—A is to be frequency modulated as a function of phased-modulation selecting signals as hereinbefore suggested, the demodulating means, shown as detector 228, 229, etc. in Fig. 3—B, and that indicated at 416 in Fig. 4—A, are replaced by any of the usual discriminators employed in the art for demodulating frequency modulated carriers, such discriminators being in addition to the phase-discrimination means hereinbefore described.

*Phase-shift metallic circuit system*

In Fig. 5 there is shown a modified embodiment of the phase-shift selecting signal system in which the signals from the remote control stations are applied directly to a metallic circuit leading to the selector or receiver unit, instead of employing a carrier for space propagation or power-line transmission, with the selecting signals superimposed thereon.

In said figure, a reference standard source of alternating voltage, such as commercial power line 500, provides across the terminals of transformer secondary 501 an A. C. signal voltage, which is phasally shifted by means such as capacity 502 in series-shunt with variable resistor means 503 across said secondary. A center-tap connection 504 from the secondary is connected to one of a pair of line conductors 505 and 506, the latter of which connects to the juncture between said capacity and resistor. Conductors 505 and 506 may be an ordinary 2-wire pair or cable leading to the phonograph or other selecting mechanism.

Connected to the terminal ends of said line pair or cable conductors, is the primary 508 of a coupling transformer, the two main secondary terminals of which are connected to discriminator plates 510 and 511, the cathodes 510A and 511A of which connect via leads 510B and 511B, through filter resistors 512 and 513 to control grids 514 and 515 of a pair of gas tetrodes 516 and 517, the same being a shield grid form of Thyratron employed as selector relay means.

A local matching signal is produced from the commercial power-line reference standard, indicated at 500A, by connection thereto of transformer primary 520 having secondary 521 shunted by phase-lift means such as capacity 522 in series with variable resistor 523, affording a phasal modifier or phase-shift network identical to means 502, 503 at the selecting station, the junction between capacity 522 and resistance means 523 being connected via lead 524 to a center tap on the line coupling or input transformer secondary, while center tap 525 of the signal source secondary 521 connects via lead 526 to the center tap between a pair of load resistors 527 and 528 across the discriminator cathodes, thus completing the local signal voltage circuit to the matching means or discriminator.

When the locally generated signals match the incoming selecting signals in phasal relation, the discriminator output is a low-amplitude ripple of approximately sinusoidal form, which is flattened out as desired by filter means including resistors 512 and 513 and capacitors 512A and 513A.

Grids 514 and 515 are normally biased to quench or cut-off voltage by battery or source 530 connecting to center tap of a pair of resistors 531 and 532 across said grids. The two relay tube plates 533 and 534 connect to the positive plate supply voltage through the winding 535 of a stepping switch solenoid which steps the phonograph selector switch wiper 536 over its contact bank 537, and which also rapidly operates the normally closed interrupter switch 538 for opening the cathode ground return lead 539 for the Thyratron relay tubes, as well as the phase-modifying or shifting means, which is to say, in this instance, the variable resistor 523.

So long as there is a phase difference between the incoming and locally generated signals a local control voltage will be applied to one or the other of the relay tube control grids 514 or 515, thus energising the step switch solenoid 535 and changing in a progressive sense the values of resistor 523; and with each stepping operation as aforesaid, interruptor switch 538 opens and quenches the relay tubes 516, 517.

As a further consequence of stepping of the selector switch, a normally open grounding switch 540 is momentarily closed, thereby grounding the incoming line signals between grounds 541 and 542, so that line signals, rectified by rectifying means 543, are not applied to the control grid 544 of control relay tube 545, in consequence of which grid timing capacity 546 does not have sufficient time to charge up and positively charge said grid against the negative bias voltage of battery 547.

When the local signals phasally match the incoming signals, there is an effective null across the discriminator output, so that the gas relay tubes do not fire, and the stepping switch remains at rest, in consequence of which timing capacity 546 charges up and throws grid 544 positive, causing current flow in the circuit of control tube plate 548, which connects through control relay windings 549 and 550 to the positive plate supply source, causing relay contact 549A to pull up and apply ground 551 via conductor 552, now normal relay contacts 553 and 554, conductor 555, to selector switch wiper 536, so that the latter will close an operating circuit from said ground through one of the selecting coils 556, battery or power source 557, to ground 558.

Relay winding 549 is shunted by timing capacity 549A, and winding 550 by capacity 550A, such that the latter winding is slower to saturate than the former, whereby ground 551 can be applied before contacts 553 and 554 on the second relay open.

As soon as both relays are pulled up, ground 551 for the relay tubes, through interrupter switch 538, is broken at relay contacts 549A'—560, effecting a lockout against any selecting operation by incoming signals until the system is normalized, as by release of the two control relays 549, 550 and discharge of timing condensers 546, following cessation of the incoming selecting signals.

Having thus described my invention, what I particularly point out and distinctly claim as my invention, discovery, and origination is:

1. Remote control apparatus comprising a carrier transmitter and remote receiver, identical phase modulation reference standards for said transmitter and said receiver, selecting signal modulating means utilizing said standard for selectively modulating said carrier with any of a plurality of phasal selecting impulses, matching signal phase modulation means utilizing said standard at said receiver for reproducing one at at time in a predetermined order the range of selecting signal impulses aforesaid and electrically comparing the same with received modulations, and selecting means operating responsive to substantial identity of compared received and matching impulses.

2. Power-line selecting means for automatic phonographs and comprising circuit means for transmitting over a power line different selecting impulses which are a function of phase-angle characteristics derived from an alternating voltage on said line, and remote circuit means receiving said impulses and comparing them electrically one at a time with a succession of locally produced impulses which are likewise corresponding functions of said phase-angle characteristics, and phonograph selector mechanism actuated responsive to an electrical condition resulting from comparison of a received selecting impulse and the identical locally produced impulse.

3. The method of controlling selective apparatus which comprises transmission of different selecting impulses each characterized as a function of phase angle relations derived from an alternating voltage standard, generating one at a time a plurality of duplication impulses each likewise characterized as a function of phase angle relations derived from said standard, electrically comparing the transmitted impulses with duplication impulses, and actuating said selective apparatus by the electrical condition resulting when the said compared transmitted and duplication impulses are substantially matched in phasal characteristic.

4. Remote control apparatus comprising means for generating selecting signal impulses different from each other as functions of phase angle relations derived from an alternating voltage standard, means for receiving said impulses and including apparatus for generating a multiplicity of local impulses each likewise characterized as a function of phase angle relations derived from said standard and each of which duplicates one of said selecting impulses, means for electrically comparing said local impulses with received selecting impulses to produce an electrical control factor having a first characteristic when the received and local impulses are different, and having a second characteristic when said latter impulses are substantially identical, means operating under control of said control factor to vary in fixed steps the local impulses as to phase angle characteristic so long as said control factor has the first characteristic until such time as the received and local impulses are identical as aforesaid, and means actuating a selector device responsive to said control factor when the latter has the second characteristic.

5. Phonograph remote control apparatus including a selecting station having a thermionic oscillator coupled to an A. C. power line, means operated manually for selectively modulating the oscillator with phase-shifted selecting signals each corresponding to a particular phonographic selection, and derived from said A. C. line, and selector station apparatus including an automatic phonograph and a selecting switch therefor, together with means for generating local phase-shifted signals, phasing means coacting with said selecting switch to phasally modify the local signals to degrees of phase-shift each corresponding to one of said selecting signals and to a particular phonographic selection selectable by said selecting switch, selector relay means for operating said phasing means and said selecting switch in step-by-step operation, an operating circuit for said selector relay means and into which is fed both selecting signals and local signals, said selector relay means being operated to effect a phonographic selection through said selecting switch responsive to a condition dependent upon a degree of phasal difference between said selecting and local signals, said local generating means and phasing means deriving phasal components from said A. C. line, together with means for deriving selecting signals from said line, for feeding into said operating circuit.

6. Control apparatus as set forth in claim 5 and further characterized by the provision therein of a timing circuit cooperable with said relay means and operating circuit to restore said apparatus to a normal non-phonographic selecting condition after lapse of a certain time following each phonographic selection effected as aforesaid.

7. Apparatus as set forth in claim 6 and further characterized by the provision of circuit means for shaping both the selecting signals and local signals to corresponding wave form for electrical comparison and matching in said operating circuit.

8. Apparatus as set forth in claim 7 and further characterized by the provision therein of poling means for both selecting and local signals to provide polarities therefor suitable for comparison and matching purposes as aforesaid, without regard to line polarities respecting said A. C. line.

9. Apparatus as set forth in claim 5 and further characterized by the provision of circuit means for shaping both the selecting signals and local signals to corresponding wave form for electrical comparison and matching in said operating circuit.

10. Apparatus as defined in claim 9 and further characterized by the provision of poling means for both selecting and local signals to provide polarities therefor suitable for comparison and matching purposes as aforesaid, without regard to line polarities respecting said A. C. line.

11. In a remote control system, a transmitter and a receiver; means at the transmitter for generating selecting signals different from each other as functions of phase angle relation derived from an alternating voltage standard; means for transmitting said signals to the receiver; means at said receiver for demodulating, depolarizing and shaping the transmitted selecting signals and applying same to the input of thermionic relay means; means at the receiver for deriving from said alternating voltage standard local depolarized signals of shape and frequency corresponding to the selecting signals; a phase shifter effective to selectively modify the phase of said local signal in sequential steps throughout the range of phase variation of said transmitted signal; said local signals being applied to the input of said relay means for direct comparison with said selecting signals; and circuit connections and means controlled by said thermionic relay means for actuating said phase shifter repeatedly in steps as aforesaid responsive to resultant control voltages from dissimilar signals but arresting operation of said phase shifter responsive to control voltages resultant from identical incoming and local signals.

12. In a remote control system, a transmitting station and a receiving station, each associated with a reference source of periodic voltage; means at the transmitting station for generating a series of r. f. signal pulses which are phasally-shifted selectively relative to said reference source; means for transmitting said signal pulses to said receiving station; means at the receiving station for generating a series of trigger pulses responsive to said signal pulses, said trigger pulses being phase-shifted relative to said reference source an amount corresponding to the phase-shift of said signal pulses; means at the receiving station for generating a series of comparing pulses; means for shifting said comparing pulses by fixed steps into phase with said trigger pulses; means for comparing the phase of said trigger and comparing pulses; and selector means actuated in response to an electrical condition resulting from phase-shift matching of trigger and comparing pulses in said comparing means.

13. Apparatus of the class described comprising, in combination with an alternating current power line, selecting and selector means, said selecting means including a source of signal energy coupled to said line, a selectively variable phase-shift network cooperable with said signal source and operating to effect impression upon said line of different selecting signal pulses each characterized as a function of phase angle relations derived from said power line, said selector means comprising input circuit means for detecting phased-modulation signals on said power line, electronic signal-squaring means, a local source of signal pulses also derived from said power line, circuit means for selectively varying the phasal aspect of said local signal pulses step by step by predetermined amounts, a selecting switch having selecting positions each corresponding to one of said varying phasal aspects and steps and electromagnetic means for actuating said varying means and said selecting switch in step, electronic squaring means for said local pulses, a selecting circuit controlling operation of said electromagnetic means and operably energized by action therein of both squared selecting and local signal energy and dependent upon the degree of phasal identity between said selecting and local signals for varying the phasal aspect of the local signals and setting up a selection-operating circuit through said selecting switch at a said position of the latter which corresponds to a particular degree of phasal identity between the said selecting and local signals, and at that time arresting the phasal variation aforesaid.

14. Apparatus of the class described comprising at least a control and a controlled station; sources of periodic voltage of identical periodicity at said stations; means at said control station for changing the phase between the corresponding source voltage and a corresponding selecting voltage; means for transmitting the resultant phase-shifted selecting voltage to the controlled station; means at the controlled station for changing the phase between the corresponding source voltage and a corresponding local voltage; means at the controlled station for comparing the phase between said selecting and local voltages to produce a resultant control voltage, thermionic relay and circuit means controlled by said control voltage for changing the phase of the local voltage in a progressive sense until the phasal relationships of both selecting and local signals are matched, and means operating responsive to matching of phasal relationships as aforesaid for locking out at least said selecting voltages and for closing a selecting circuit identifiable with the particular phasal condition existing at time of matching as aforesaid, together with means for automatically opening said selecting circuit and releasing said lockout at the expiration of a predetermined time.

15. Apparatus of the class described comprising at least a control and a controlled station, reference sources of periodic voltage of identical periodicity at said stations, means at said stations for changing the phase between the corresponding reference source voltage and a corresponding effective voltage, means for conducting the control station phase-shifted voltage to the controlled station, means at the controlled station for converting each of the received and local effective voltages into a series of pulses of predetermined wave form, thermionic relay means at the controlled station into which the received and local signals are fed for direct comparison of the phase between them; said received and local signals being effective to produce a first voltage condition in the input of said thermionic relay resultant from substantial phasal nonidentity between said signal pulses and a second voltage condition resultant from substantial identity between said signal pulses; means controlled by said thermionic relay means effective to shift the phase of the local voltage in fixed steps in a direction to match the phase of the received voltage responsive to said first voltage condition; and means controlled by said thermionic relay means responsive to said second voltage condition for locking out at least said received signals and for closing a selecting circuit identifiable with the particular phasal condition existing at the time of matching as aforesaid, and means for automatically opening said selecting circuit and releasing said lockout at the expiration of a predetermined time.

16. Apparatus of the class described comprising at least a control and a controlled station, reference sources of periodic voltage of identical periodicity at said stations, means at said stations for shifting the phase of a corresponding effective voltage relative to the corresponding reference source voltage, means for conducting a selecting signal comprising the control station phase-shifted voltage in pulse form to the controlled station, means at the controlled station for reproducing the received selecting signal as a series of pulses of predetermined wave form, thermionic relay means at the controlled station to the input of which said selecting signals are applied; means controlled by said thermionic relay means for shifting the phase of the local effective voltage by fixed values in a direction to match the phase of the received selecting signals responsive to the application of selecting signals to the input of said thermionic relay means; said local signal likewise being applied to the input of said thermionic relay means and being effective when in phase with the selecting signal to produce a voltage condition at said input in response to which the phase-shifting of the local signal by the phase shifting means is arrested; and means operating responsive to phase-matching as aforesaid for locking out said selecting signal effective voltage and for closing a selecting circuit identifiable with the particular phasal condition existing at time of matching as aforesaid, together with means for automatically opening said selecting circuit and releasing said lockout at the expiration of a predetermined time.

17. In a remote control system for phonographs, a selecting station and a receiving station, phase comparison standard means for both stations; a selectively positionable record-selecting device at the receiving station; means at the selecting station for emitting a selecting signal having any one of a predetermined number of phase components of fixed prescribed value derived from the reference standard thereat and each corresponding to a record selection; selection-determining means at the selecting station operable to effect emission of a selecting signal having any of said prescribed phase components; circuit means utilizing said reference standard voltage at the receiving station for generating local matching signals each having one of the aforesaid prescribed phase values; direct-comparison circuit means at the receiving station for mixing the received and local signals and producing resultant voltages of a first kind when the received and local signals are mismatching, and of a second kind when said signals are matching; phase-changing switch means cooperating with said circuit means for generating matching signals and having a plurality of prescribed phase-determining positions each corresponding to one of said phase-values and a certain record selection; electrically-controlled actuating means for said switch and including mechanism to move the same from position to position, said actuating means being operably controlled by voltages of said first kind to change the phase component of the local signals by amounts of fixed predetermined value over the range of said prescribed values, to produce a local signal matching the received signal and a resultant voltage of the second kind to stop said switch-actuating means and arrest said switch in the position corresponding to the matching phase value; said switch and record selecting device being operatively coupled such that each said switch position corresponds to a certain record selecting position of said selecting device; and phonograph-control relay means controlled by received signals and by resultant voltages of the second kind for actuating said selecting device in any selecting position thereof corresponding to the position of said switch following phase-matching operations thereof as aforesaid.

EUGENE L. TRIMAN.

(References on following page)

REFERENCES CITED

The following references are of record in the file of this patent:

UNITED STATES PATENTS

| Number | Name | Date |
|---|---|---|
| 2,183,725 | Seeley | Dec. 19, 1939 |
| 2,209,507 | Campbell | July 30, 1940 |
| 2,245,829 | Seeley | June 17, 1941 |
| 2,256,487 | Moseley | Sept. 23, 1941 |
| 2,308,620 | Lear | Jan. 19, 1943 |
| 2,349,987 | Place | May 30, 1944 |
| 2,371,415 | Tolson | Mar. 13, 1945 |
| 2,378,326 | Rees | June 12, 1945 |
| 2,387,444 | Hayslett | Oct. 23, 1945 |
| 2,395,467 | Deloraine | Feb. 26, 1946 |
| 2,395,575 | Mitchell | Feb. 26, 1946 |
| 2,424,585 | Simon | July 29, 1947 |
| 2,438,888 | Andrews | Apr. 6, 1948 |
| 2,442,123 | Espley | May 25, 1948 |
| 2,445,663 | Doelz | July 20, 1948 |

Certificate of Correction

Patent No. 2,557,581                    June 19, 1951

EUGENE L. TRIMAN

It is hereby certified that error appears in the printed specification of the above numbered patent requiring correction as follows:

Column 6, line 38, after "74H," insert a closing parenthesis; column 10, lines 43 and 44, for "positions" read *position*; column 11, line 20, for "phase-shifter" read *phase-shift*; column 15, line 42, for "348 of" read *438 of*; column 19, line 1, for "phase-lift" read *phase-shift*; column 20, line 9, for "condensers" read *condenser*; line 19, for "modulating" read *modulation*; column 21, line 74, for "relation" read *relations*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*